United States Patent [19]

Bowcutt et al.

[11] Patent Number: 5,485,787
[45] Date of Patent: Jan. 23, 1996

[54] GAS GUN LAUNCHED SCRAMJET TEST PROJECTILE

[75] Inventors: Kevin G. Bowcutt, Irvine; Harry Shortland, Torrance, both of Calif.

[73] Assignee: Rockwell International Corporation, Seal Beach, Calif.

[21] Appl. No.: 264,207

[22] Filed: Jun. 21, 1994

[51] Int. Cl.[6] ............................. F42B 15/00; F02K 7/10
[52] U.S. Cl. ..................... 102/374; 60/270.1; 102/503; 102/520
[58] Field of Search .................. 60/270.1; 102/374, 102/503, 520

[56] References Cited

U.S. PATENT DOCUMENTS

| | | | |
|---|---|---|---|
| 4,428,293 | 1/1984 | Botwin et al. | 60/270.1 |
| 4,436,035 | 3/1984 | Strandli | 102/503 |
| 4,502,649 | 3/1985 | Botwin et al. | 60/270.1 |
| 4,796,534 | 1/1989 | Mikhail | 102/374 |
| 4,936,219 | 6/1990 | Mudd | 102/520 |
| 4,938,112 | 6/1990 | Hertzberg et al. | 60/270.1 |
| 5,063,826 | 11/1991 | Bulman | 102/374 |
| 5,067,406 | 11/1991 | Olson et al. | 102/374 |
| 5,183,956 | 2/1993 | Rosenberg | 102/374 |
| 5,363,766 | 11/1994 | Brandon et al. | 102/374 |

Primary Examiner—Charles T. Jordan
Assistant Examiner—Theresa M. Wesson
Attorney, Agent, or Firm—Terrell P. Lewis; Charles T. Silberberg

[57] ABSTRACT

A gas gun-launched, propulsion-assisted scramjet projectile adapted to be fired from a gun, preferably at velocities greater than Mach 5, includes a body with an external compression section, an internal compression section, a combustion section, a nozzle section, and means for channeling ambient fluid to an engine in one of the sections of the body, the channeling means and the body cooperating with the engine to produce thrust greater than drag when the projectile travels at velocities greater than Mach 5. The projectile further includes a plurality of circumferentially spaced stabilization fins located at the nozzle region of the body and a sabot assembly releasably secured to the rear portion of the body, where the sabot assembly includes a plurality of elements joined together about the body rear portion to form a housing for protecting the body rear portion from explosive gases in the barrel of the gun.

4 Claims, 4 Drawing Sheets

GAS GUN LAUNCHED SCRAMJET TEST PROJECTILE

BACKGROUND OF THE INVENTION

1. Field of the Invention

The present invention relates to high speed gun launched test projectiles, and more particularly to gas gun launched propulsion-assisted test projectiles which incorporate scramjet engines that accelerate the projectile after launch, and which facilitate the attainment of flow physics and performance data that correlates directly with full-scale airframe integrated scramjets, thereby minimizing the need for testing full scale scramjet powered vehicles.

2. Description of the Related Art

The ramjet and supersonic ramjet (scramjet) propulsion cycles for supersonic and hypersonic (Mach>5) engines are well-known within the art of aerospace propulsion. For sake of discussion, consider an engine defined by an external compression device or forebody, an internal compression device such as an inlet including a diffuser and an isolator, a combustion device or combustor, and an expansion device or nozzle. All surfaces wetted by flow streamlines ultimately passing through the engine are considered to be a part of the engine flowpath since they contribute to the engine performance. Consequently, the integration of the airframe and the propulsion systems for vehicles or projectiles employing these propulsion technologies is critical for high performance.

In the ramjet propulsion cycle, high velocity air is compressed through a series of forebody and inlet shocks and through a subsonic diffuser, all of which decelerate the air to a subsonic velocity near the fuel flame speed. Fuel is injected into a combustor and conventional subsonic combustion occurs, thereby increasing the temperature and pressure of the flow. The high pressure gas is then expanded through a nozzle, increasing the velocity and momentum of the flow to produce thrust. This cycle is efficient for freestream Mach numbers ranging between approximately 2 and 5.

However, for freestream velocities above about Mach 5, the temperatures and pressures associated with decelerating the flow to subsonic speeds for combustion are severe and begin eroding engine cycle performance.

The static temperature at the combustor entrance approaches the stagnation temperature and dramatically impacts fuel combustion. At such extreme temperatures, an appreciable amount of the energy which would be released due to combustion is bound in dissociated air and combustion product molecules such that the temperature rise due to combustion is reduced. The energy contained in dissociated gases is largely unavailable for the expansion and acceleration of the exhaust mixture, thereby causing a loss in thrust.

For Mach numbers above 5, a principal advantage of scramjet propulsion is that supersonic velocities within the combustion chamber are accompanied by lower static temperatures, pressures, and reduced total pressure losses. By reducing combustion product dissociation reduced temperatures increase combustion efficiency, reduced pressures decrease loads on engine structure, and reduced total pressure losses (entropy gains) increase the flow energy available for thrust production.

A large number of parameters impact the specific impulse ($I_{sp}$, or thrust per pound of propellant) performance of ramjet and scramjet systems. They include, but are not limited to, the forebody and inlet contraction ratios, the inlet efficiency, the fuel mixing efficiency, the combustion efficiency, and the nozzle efficiency.

The purpose of the inlet is to capture a desired quantity of air flow and deliver it to the combustor at a desired pressure and Mach number with a minimum of entropy producing losses. The technology and parameters necessary to successfully design and operate an efficient supersonic inlet are well-known but difficult to capture in a single design. The mass flow captured by the inlet compared to the drag of the vehicle must be sufficiently large that a net thrust can be expected across the entire Mach number range of operation for achievable values of ramjet or scramjet $I_{sp}$ performance.

The isolator (also known as a constant area diffuser) is located between the inlet and the combustor entrance, and is necessary to adjust flow static pressure from that of the inlet exit to the higher combustor pressure downstream during ramjet and early scramjet ("dual-mode") operation. When combustor pressure rise is large and inlet Mach numbers low, as in ramjet operation, boundary layer separation in the combustor can lead to inlet interaction and engine unstart. An isolator permits a shock train to develop between the inlet and combustor with a near normal shock static pressure rise without any upstream inlet interaction. The length of the isolator is a critical design consideration in carrying out this function.

The combustor provides the physical domain for injecting a liquid or gaseous fuel into high velocity air and mixing the fuel and air for combustion. The fluid and chemical phenomena present in the combustor are extremely complex and include the effects of laminar and turbulent mixing of fuel injection jets with boundary layers and core flows, and the finite rate chemical kinetics of the exothermic combustion reactions. Fuel ignition and flameholding are also important issues. Some of the typical design parameters are the fuel injection geometry, the mixing enhancement devices, and the length of the combustor required to achieve the high mixing and combustion efficiencies necessary for high $I_{sp}$ performance across the Mach number range of interest. Fuel injection location and mixing rate (i.e., distribution of heat release) is also important for controlling if and where flow choking (Mach 1) occurs in the combustor. Fuel is generally injected aft in ramjet mode, both fore and aft in dual-mode (combined supersonic and subsonic combustion), and forward in scramjet mode.

The nozzle or expansion system is critical to the performance of the projectile engine because it produces thrust by accelerating the high static pressure flow exiting the combustor to lower pressure and higher velocity (i.e., high momentum). Typically composed of internal and external nozzles, the objective is to expand the high pressure flow to the lowest pressure possible using a shape that minimizes the combination of friction losses, chemical recombination losses, and flow divergence (angularity) losses.

The ratio of the nozzle expansion area to the inlet capture area and the ratio of inlet mass flow to nonflowpath drag are critical figures of merit in designing a system which produces a flowpath thrust that exceeds the nonflowpath drag and therefore produces acceleration. Balancing the geometric details for high efficiencies and high $I_{sp}$ performance with the vehicle drag is the traditional challenge inherent in ramjet and scramjet vehicle design.

Research in supersonic air-breathing propulsion systems for aircraft and missiles has been in progress since the 1940's. As empirical knowledge grew in the late 1950's, researchers investigated propulsion for hypersonic aircraft and missiles using scramjet engines. Research into scramjet propulsion continued during the 1970's at the NASA Langley Research center and John Hopkins Applied Physics Laboratory, and in the 1980's and 1990's grew considerably under the auspices of the National Aerospace Plane program. Unfortunately, no scramjet engines have been demonstrated outside of a wind tunnel. Again, these research activities focused exclusively on aircraft and missile applications.

U.S. Pat. No. 4,291,533 to Dugger et al. describes a rocket-launched scramjet powered missile. Typical gun-launched projectile accelerations of tens of thousands times greater than the acceleration of gravity (g) far exceed the approximately hundred g acceleration of a typical high performance rocket booster, and consequently would prevent directly adapting the missile design described or any other missile to gun launching to the velocity required to initiate a ramjet or scramjet engine.

Application of ramjet propulsion to gun-launched projectiles have been described by Olson et al. in U.S. Pat. No. 5,067,406 and by Flatau in U.S. Pat. No. 4,539,911. These patents considered tubular projectiles utilizing a solid propellant. These concepts focused on producing thrust which essentially balanced the aerodynamic drag in order to reduce the deceleration of the projectile as opposed to accelerating beyond the muzzle velocity. The lightweight construction of these projectiles also severely constrains the gun launch acceleration loads which the projectiles can survive and restricts the muzzle launch velocity. The flowpath through the center of the projectile also limits the fuel which can be carried and hence the projectile range which can be achieved or increase in velocity if thrust exceeds aerodynamic drag. These concepts cannot carry a payload of significant volume or size due to interference with the propulsive flowpath.

Botwin et al. in U.S. Pat. No. 4,428,293 addresses the payload and fuel volume issues of the previously referenced patents to Olson et al. and Flatau. However, Botwin specifically discloses that the ramjet powered projectile is designed to maintain a thrust-to-drag balance such that it follows a predetermined vacuum ballistic trajectory.

A scramjet system launched from a light gas gun for scramjet propulsion testing and experiments in a closed test chamber was documented in 1968 by H. H. King and O. P. Prachar in the Air Force Aero Propulsion Laboratory Technical Report AFAPL-TR-68-9. This study represents the only known attempt to launch a scramjet-shaped projectile from a gun barrel, and was conducted to investigate issues pertaining to launch and acceptable free flight of an annular combustor scramjet model. The scramjet model was too small to include a fuel system, and was therefore limited to unfueled launches to verify structural integrity and aerodynamic stability. Fuel systems were tested separately in simple cones only, not in scramjets.

The design of the model included an internal contraction ratio (i.e., the ratio of the inlet area at the cowl leading edge to the minimum flow area downstream of the cowl leading edge) of unity for positive inlet starting characteristics, but with a very low airflow capture area to drag ratio with the result that a net thrust or positive acceleration could not be produced even if it was fueled.

OBJECTS AND SUMMARY OF THE INVENTION

It is therefore a principal object of the present invention to provide a gas gun-launched scramjet test projectile which will overcome all the deficiencies and drawbacks of known gas gun-launched scramjet projectiles.

Another object of the present invention is to provide a gas gun-launched, propulsion-integrated test projectile which enables the simulation of flow physics and acquisition of performance data that correlates directly with those of a scramjet powered vehicle.

Yet another object of the invention is to provide a scramjet test projectile which integrally incorporates an inlet, an isolator, a combustor, an internal nozzle, an external nozzle, a fuel storage tank, fuel distribution lines and manifolding, and a fuel release mechanism, where the test projectile is able to withstand the high acceleration loads of a gun launch.

These and other objects are achieved by the test projectile of the present invention which includes a forebody having an air compression surface, an engine assembly disposed in a mid-region of the body and including an encompassing cowl disposed about the circumference of the body mid-region, and a nozzle section disposed to the rear of the engine assembly. The projectile assembly also preferably includes a sabot or container-like shell which encircles the rearward portion of the nozzle section, and protects that region of the projectile from the high pressure gases generated by the gun in which the projectile sits until it is fired from the gun. The cowl leading edge portion is configured to cooperate with the external surface of the projectile to capture the air which has been compressed by, and is leaving, the compression surface of the projectile body.

The facing surfaces of the cowl and the body are configured to define therebetween an internal inlet, isolator and combustor in which takes place further compression of the air, introduction of fuel, and expansion of the combusted air-and-fuel products. The rear end portion of the cowl is configured to direct the exiting combusted air-and-fuel mixture over the nozzle section of the projectile.

BRIEF DESCRIPTION OF THE DRAWINGS

Similar elements or parts in the various figures of the drawings are designated by the same or similar reference characters.

DETAILED DESCRIPTION OF THE PREFERRED EMBODIMENTS

Figure 1:
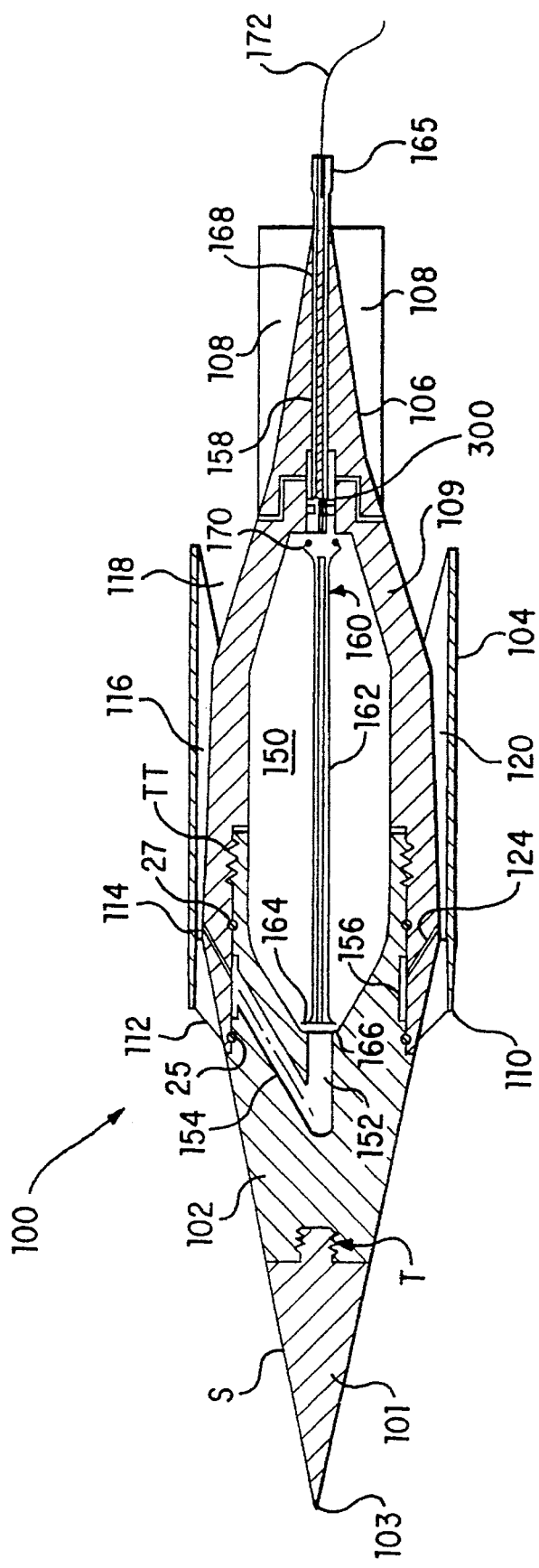
FIG. 1 illustrates a side sectional view of the gun launched scramjet test projectile according to the present invention.

The scramjet test projectile according to the present invention includes a projectile body 100 (FIG. 1) and a sabot assembly 200 (FIGS. 2 and 3) coupled to the body for initiating projectile fuel operation when the combined assembly (100 and 200) leaves the gun barrel (see more detailed discussion below). The projectile body 100 (preferably made of aluminum) includes a nosecap 101 (preferably of copper), a forebody portion 102 (preferably of aluminum) exhibiting a compression surface S, a cowl 104 (preferably of aluminum) enclosing an engine assembly (to be discussed in greater detail below), and a nozzle portion 106 exhibiting an external expansion surface. The nozzle 106 includes a plurality of aerodynamic stabilization fins 108.

The nosecap 101 is secured to the forebody 102 via cooperating threaded portions shown at T. The forebody 102 includes an external surface extending from the projectile nosetip 103 rearwardly to the vicinity of the leading edge of the cowl 110. The external surface of the forebody is configured to compress the fluid through which it passes as the projectile travels along its trajectory. The cowl leading edge 110 has a radius which is sized to survive aerodynamic heating. The inlet 112 must have a small enough area contraction to permit the inlet to start (i.e., swallow initial shocks). The external expansion surface of the nozzle or nozzle portion extends from the vicinity of the trailing edge of the cowl rearwardly. The fins 108 are disposed over substantially the same longitudinal (axial) extent of the nozzle external expansion surface, and are used to stabilize the projectile during its flight (as for example preventing unbounded pitch rotation). A main body portion 109 is threadedly secured to the forebody 102 via threads TT, and O-rings 25 and 27 are provided on opposite axial sides of the plenum 156 for sealing the connection between the two body portions 102 and 109, as well as the plenum 156.

The cowl 104 surrounds the body 100 in such a manner as to create an engine internal flowpath defined by an inlet 112, an isolator 114, a combustor region 116 and an internal nozzle 118.

The cowl 104 is supported by splitters 120 spaced circumferentially about the projectile body 100. The splitters serve to segregate adjacent internal flowpaths which are individually fueled by fuel injectors supplied by fuel injection orifices 124 located in the combustor region 116. While not shown here, fuel injectors may also be located in the splitters and/or on the cowl. The scramjet projectile of the present invention is capable of high "g" accelerations (on the order of about 35,000 g). The cowl splitters 120 are provided with widths which thicken as a function of the length of the splitter to accomodate aft build up of structural loads. It is to be understood that ablative materials (e.g., Teflon) or heat sink metals (e.g., copper) may be used to protect the cowl and splitter structure from high localized aerodynamic heat loads.

Within the projectile body is a fuel cavity 150 which contains a fuel material in a gaseous state, such as hydrogen, ethylene., etc. The fuel material is installed under a high pressure, which for the present design is on the order of 7000 psia.

A fuel delivery channel 152 extends from the cavity 150 forwardly to a plurality of fuel distribution channels 154 which are disposed at predetermined radial orientations relative to the longitudinal axis of the projectile. The outer radial extent of each fuel distribution channel is coupled to a fuel plenum 156 provided at a region of the body opposite the cowl 104, downstream of the inlet 112. The fuel plenum communicates with the injectors 124 for distributed delivery of the fuel material to the internal engine flowpath at a location between the isolator 114 and the combustor region 116.

A fuel activation pin channel 158 extends between the rearward end of the fuel tank 150 and the aftmost end of the nozzle portion of the projectile body 100. The channel 158 is preferably disposed centrally along the longitudinal axis of the body.

A fuel activation pull pin 160 has a shank 162, which is disposed within the channel 158 and which extends through the fuel tank 150, as well as a forward head 164 which makes sealing engagement with a correspondingly configured seat 166 located at the mouth of the fuel distribution channel 152.

In addition, the fuel activation pin 160 has a fuel charging channel 168 extending between the fuel pin stop collar 170 and the aft end of the pin. The channel 168 is disposed centrally along the longitudinal axis of the pin 160 and exits the side of the pin just aft of the stop collar 170. A capillary tube 172 is disposed within the channel 168 and is the means for loading the gaseous fuel into the fuel cavity 150 just prior to gun launch.

Figure 2:
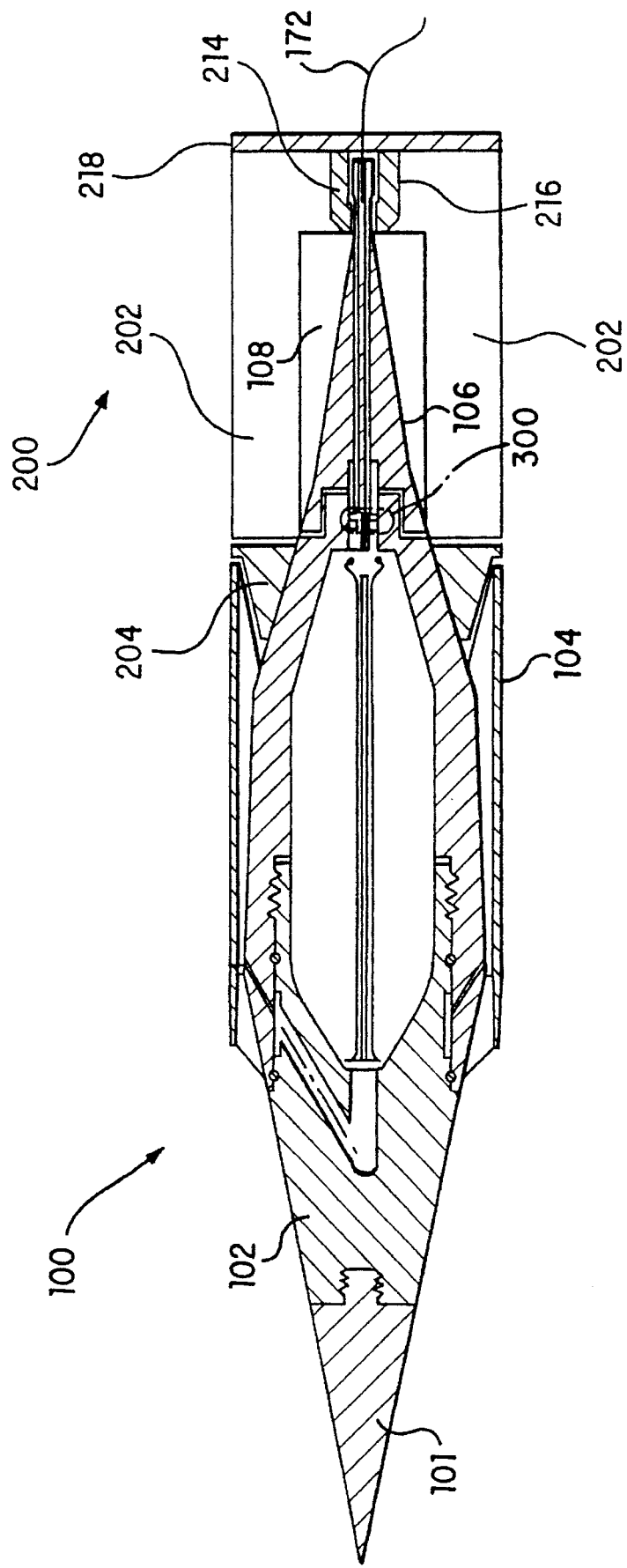
FIG. 2 is a side sectional view of a the gun-launched scramjet test projectile as shown in FIG. 1 including a sabot assembly mounted on the nozzle end of the projectile.
Figure 3:
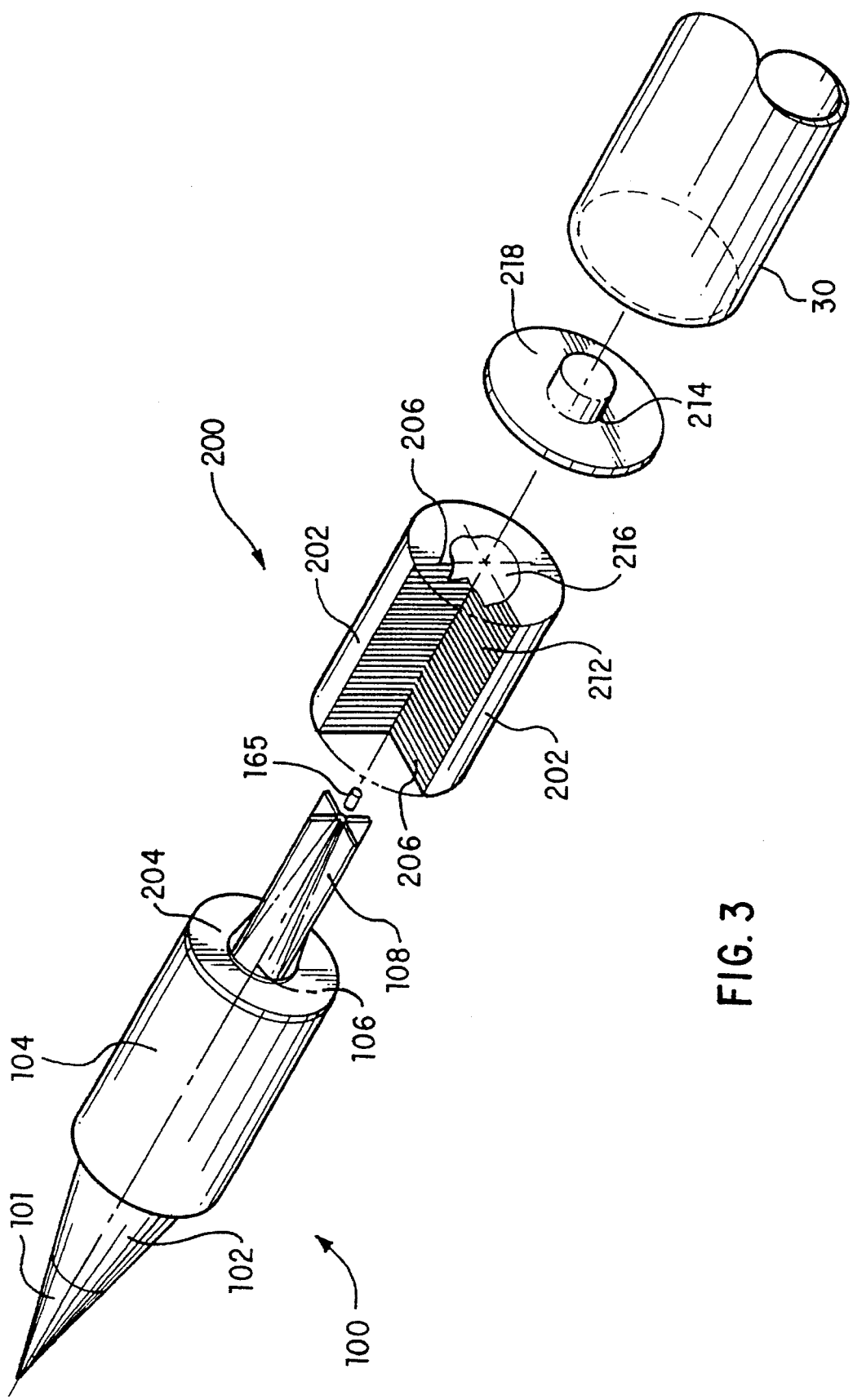
FIG. 3 is a perspective exploded view of the scramjet test projectile and sabot assembly according to the present invention.

The sabot assembly 200 (see FIGS. 2 and 3) comprises a plurality of annular segments 202 which are configured to be positioned adjacent one another to form a hollow shell that is dimensioned on the interior to fit about the nozzle 106 and fins 108 of the projectile 100. Fitted within the internal nozzle 118 and forwardly of the sabot assembly 200 is a metal thrust ring 204 that transfers the gas gun accelerating forces from the sabot to the scramjet projectile. The thrust ring 204 is preferably of a material which has a high strength to weight ratio, as for example titanium. The side faces 206 of adjacently positioned segments include radially extending ribs 212 which, when the segments are assembled, prevent relative longitudinal or axial movement of the segments. At the rear end of the sabot is a recess 216 into which a stainless steel cup 214 fits. The cup is secured centrally on a pusher plate 218 which fits against the aft end of the sabot assembly. As shown in FIGS. 1 and 3, the end 165 of the pin 160 has an enlarged diameter adapted to be secured within the interior of the cup 214.

The sabot assembly therefore is essentially made up of the metal ring 204, pusher plate 218, and the nylon segments 202, and functions to transfer pressure loads from the gun propellant to the projectile.

All the sabot segments along with the thrust ring 204 and pusher plate 218, when assembled together, form a container which houses the trailing or nozzle end of the projectile in a snug fit and protects the nozzle end of the projectile from the high pressure gases in the gun barrel following firing of the gun.

As the projectile and sabot assembly emerge from the gun barrel, the elements of the sabot assembly 200 separate from one another under the high pressure loads created by ambient fluid (e.g., air) passing through the engine flowpath and impacting the forward face of the thrust ring 204.

The stability of the projectile 100 within the gun barrel is provided by the sabot assembly 200 which protects the rear end of the projectile from the high pressure gun blast initially propelling the projectile and provides a mechanism for transferring the force of the blast to the high strength projectile base.

The stability of the scramjet projectile 100 after launch and exit from the gun barrel is provided by a plurality of stabilization fins 108 integrated with selected splitters. Although not shown, the span of these fins and hence their area could be increased beyond the barrel diameter using devices located within the fins and deployed after the projectile clears the barrel 30.

After launch, the projectile assembly clears the end of the gun barrel at hypersonic velocities. At that time, upon entering the dense ambient air, the annular elements and thrust ring of the sabot "container" separate from one another and cause the pin 160 to be driven in an aft direction by virtue of the pin end 165 being locked within the cup 214 on the end plate 218. In this manner, the pin head 164 disengages from the seat 166, and the pin stop collar 170 engages the aft end of the fuel cavity 150, sealing the pin channel 158 from aft leakage of fuel from the fuel cavity.

The aft end of the actuator pin 160 is mechanically separated at region 300 (see FIG. 1) by ejection forces transmitted through the stainless steel collar 214 and remains with the spent sabot assembly.

Nearly simultaneously with the sabot separation and pin unseating, the pressurized fuel material in the fuel tank 150 is forced into the fuel distribution channels 154 to the fuel injectors 124. The internal fuel system of the scramjet projectile is a "blow-down" fuel delivery system, which causes the fuel to be injected into, and ignited in, the internal engine flow path. The internal fuel system of the projectile could be fitted with a regulator to keep the flow rate of fuel to the injectors constant.

By adding fuel in a ramjet or scramjet engine cycle, and expanding the combustion products through the nozzle, thrust is produced sufficient to exceed the drag of the projectile causing it to accelerate. By measuring the acceleration, scramjet performce parameters, such as thrust and specific impulse, can be deduced.

Verifying the performance of a scramjet engine ultimately requires measuring the thrust and specific impulse of the engine, in addition to detailed flow parameters such as pressure and heat flux. To make such measurements truly meaningful, two things must be represented in a test: (1) relative geometry and (2) flow physics scaling. Relative geometric similarity simply requires that the ratios of all subscale engine dimensions to some characteristic subscale dimension must have the same values as those of a full scale engine. For example, the ratio of throat height to engine length must be maintained. Flow physics scaling on the other hand requires that similarity parameters such as Mach number, flow enthalpy and Reynolds number be matched to flight values.

Most wind tunnel tests cannot match flight values of flow similarity parameters because geometric scale is small relative to flight and air pressure is low compared to flight. Even subscale flight testing cannot simulate all of the required physics unless flight dynamic pressure is increased in inverse proportion to the length scale. However, using a light gas gun to test scramjets in sea level atmospheric air, all of the flow parameters of a full-scale engine can be simulated. First, the gas gun can fire projectiles in excess of 20,000 ft/sec, thereby simulating flow enthalpy up to Mach 20 directly. Since atmospheric air temperatures do not vary more than 100 degrees Fahrenheit between sea level and 200 kft altitude, close Mach number simulation follows velocity, or enthalpy simulation, directly. If necessary, minor Mach variations can be accommodated by perturbing forebody compression angles. With velocity matched, Reynolds number can be simulated by matching the product of density ($\rho$) times length (l).

Figure 4:
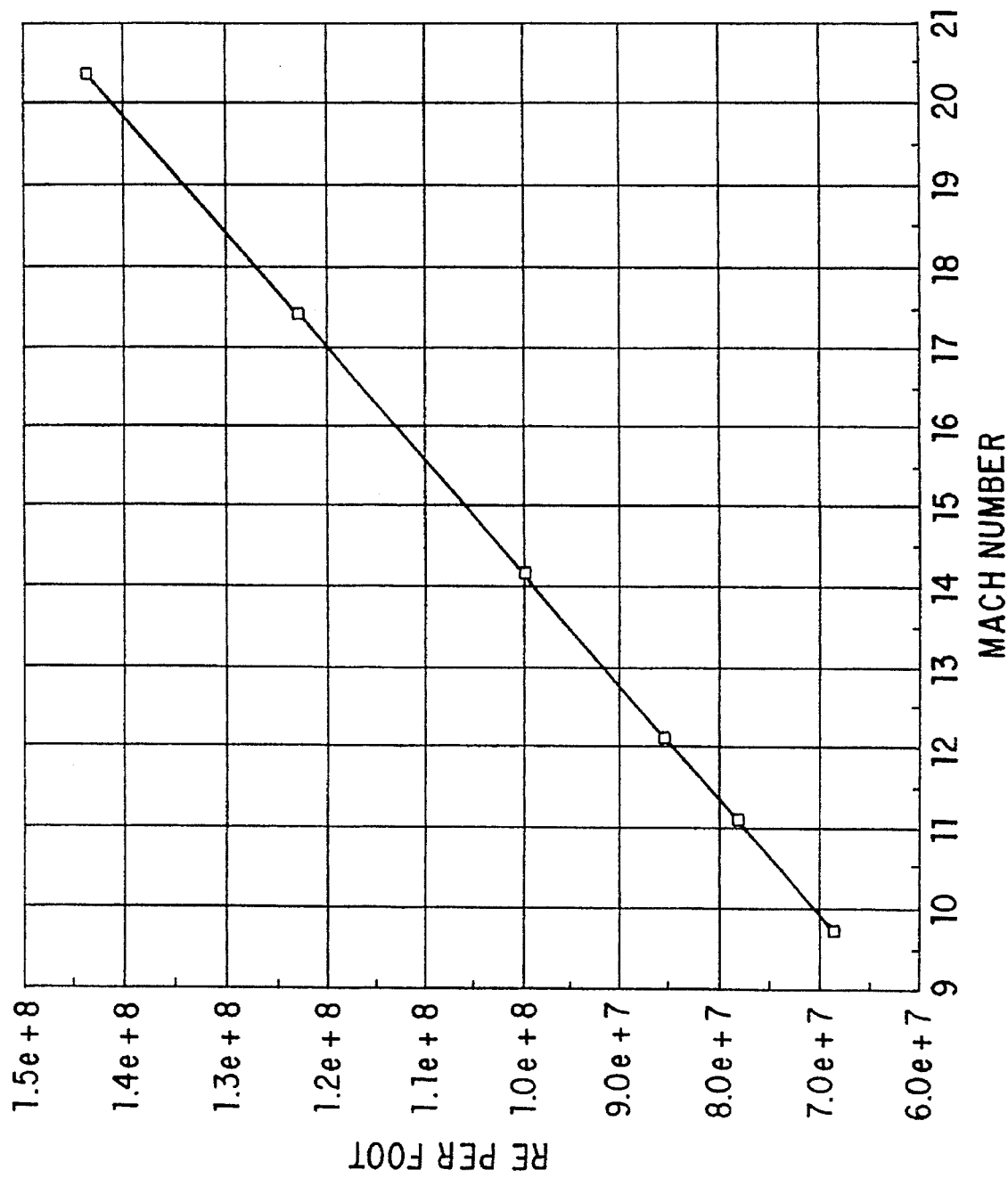
FIG. 4 is a graphical representation of data showing a plot of gas gun generated unit Reynolds number as a function of launch Mach number.

For example, a scramjet powered vehicle which is 100 feet long flying at Mach 10 and a dynamic pressure of 2000 psf (i.e., 95 kft altitude) will have the same Reynolds number as a 22 inch nose-to-tail model of the scramjet powered vehicle launched from a gas gun at sea level conditions. This result is supported by FIG. 4 which shows a plot of gas gun generated unit Reynolds number as a function of launch Mach number. With Mach, enthalpy and Reynolds number, hence $\rho \times l$, matched, all scramjet component performances will also be matched. For example, boundary layer transition, specific friction drag and specific heating on the forebody and inlet will be the same as those of a full scale scramjet. Therefore, inlet efficiency and enthalpy ratio will match those of a full scale engine. In the combustor, Reynolds number and Mach number simulation will ensure that mixing of fuel and air scales exactly, and $\rho \times l$ matching ensures that binary chemical reactions, such as those that initiate fuel-air combustion, scale exactly.

This chemistry scaling holds true because binary reaction rates scale as flow density, combustor residence time scales as combustor length divided by velocity, hence degree of reaction scales as reaction rate times residence time, or $\rho \times l$, when velocity is also matched. The rates of tertiary reactions, such as those that form the final combustion product, water, scale as density squared, hence degree of reaction scales as $\rho^2 \times l$ when the velocity is matched. Since $\rho \times l$ is matched in gas gun testing, and the value of $\rho$ is much larger, three-body reactions actually advance faster in gas gun tests than in full scale flight both in the combustor and in the nozzle. As a result, both mixing and combustion efficiencies will match flight values. Finally, because Mach, velocity and Reynolds number are matched, specific nozzle losses will match those of a full scale flight vehicle, with the exception of the small advantage the gun test approach has in chemical kinetic losses, and so nozzle efficiency will also closely match that of a full-scale flight vehicle.

The end result of matching both component performance parameters and geometric similarity of a full scale scramjet is that thrust coefficient and specific impulse will also match those of a full scale scramjet at flight conditions. This leaves only the task of measuring thrust, and hence acceleration, of a gun-launched scramjet.

This is currently being done using two approaches: the first employs two or more velocity traps comprising foil triggers that the scramjet flies through, while the second uses an on-board accelerometer and telemeter to transmit the data to a ground recorder. The latter technique can also be used to telemeter scramjet flow properties (e.g., pressure) to compare against detailed Computational Fluid Dynamics (CFD) predictions. Both techniques are viable and have been largely demonstrated in past and present tests.

In summary, scramjet launched from a light gas gun in sea level air can reproduce all of the flow scaling parameters and component performances of a full scale flight vehicle, is therefore equivalent to full scale flight testing and can be trusted to measure and verify the predictions of thrust and specific impulse of scramjets up to at least Mach 16.

Obviously, many modifications and variations of the present invention are possible in light of the above teachings. For example, projectiles in accordance with the present invention may include cowling arrangements which are annular, two-dimensional planar, or inward turning (where the air is scooped and directed toward the center of the projectile). In addition, on board instrumentation and telemetry can be used to make acceleration and scramjet flow measurements that can be telemetered to a ground recording station. It is, therefore, to be understood that within the scope of the appended claims, the invention may be practiced otherwise than as specifically described.

What is claimed and desired to be secured by Letters Patent of the United States is:

1. A gas gun-launched, propulsion-assisted scramjet projectile adapted to be fired from a gun at velocities greater than Mach 5, comprising:

a body, including an external compression section, an internal compression section, a combustion section, and a nozzle section, a sabot assembly releasable secured about the rear end portion of said body, means for providing fuel at said combustion section, means, coupled with said sabot assembly, for initiating operation of said fuel providing means when said sabot separates from said projectile as it exits from the barrel of the gun, and means for channeling ambient fluid to an engine in one of the sections of the body, said channeling means and said body cooperating with the engine to produce thrust greater than drag when said projectile travels at velocities greater than Mach 5.

2. The projectile of claim 1, and further including a plurality of circumferentially spaced stabilization fins located at said nozzle section of said body.

3. The projectile of claim 1, wherein said sabot assembly includes a plurality of elements which are joined together about the body rear portion and form a housing for protecting said body rear portion from explosive gases in the barrel of said gun.

4. The scramjet projectile of claim 1, wherein said body includes configuration-defining means for generating measurable flow physics and performance data that correlates directly with flow physics and performance data of larger scale scramjet engines.

* * * * *